United States Patent [19]

Migny

[11] Patent Number: 5,394,167
[45] Date of Patent: Feb. 28, 1995

[54] DISPLAY DEVICE
[75] Inventor: Philippe Migny, Fondettes, France
[73] Assignee: Securite et Signalisation, Tours, France
[21] Appl. No.: 277,773
[22] Filed: Jul. 20, 1994

Related U.S. Application Data

[63] Continuation of Ser. No. 22,364, Feb. 25, 1993, abandoned.

[30] Foreign Application Priority Data

Feb. 27, 1992 [FR] France .................. 92 02311

[51] Int. Cl.⁶ .................................. G09G 3/20
[52] U.S. Cl. ............................ 345/147; 345/207; 345/212; 345/1
[58] Field of Search ............... 345/1, 211, 63, 147, 345/212, 207; 340/310.R, 815.31, 717, 767, 793, 784; 359/42, 86

[56] References Cited

U.S. PATENT DOCUMENTS

| | | | |
|---|---|---|---|
| 4,299,447 | 11/1981 | Soltan | 350/334 |
| 4,825,201 | 4/1989 | Watanabe | 340/717 |
| 5,053,765 | 10/1991 | Sonehara et al. | 340/815.31 |
| 5,095,502 | 3/1992 | Finzel | 340/310.R |
| 5,160,921 | 11/1992 | Fillinger | 340/815.31 |

FOREIGN PATENT DOCUMENTS

| | | | |
|---|---|---|---|
| 2535882 | | France . | |
| Z246000 | 1/1992 | United Kingdom | 340/767 |
| 0002530 | 4/1988 | WIPO | 340/784 |

Primary Examiner—Ulysses Weldon
Assistant Examiner—Regina Liang
Attorney, Agent, or Firm—Ladas & Parry

[57] ABSTRACT

The display device comprises: a main control circuit for generating a light intensity reference; n secondary control circuits, each associated with a respective one of the n display subassemblies, each secondary control circuit including circuit for receiving the reference and circuit for monitoring the light source(s) of the associated subassembly so that each emitted light intensity corresponds to the reference light intensity; the monitor circuit presented by each secondary control circuit comprising circuit for directly detecting each light intensity emitted by the associated light source(s), circuit for comparing each light intensity with the reference, and circuit for controlling the power supply to the associated light source(s) as a function of the result of the comparison; and the circuit for direct detection of each light intensity comprise one or more fibers of the bundle of optical fibers and connected to a photoelectrical converter device.

8 Claims, 4 Drawing Sheets

Fig_1
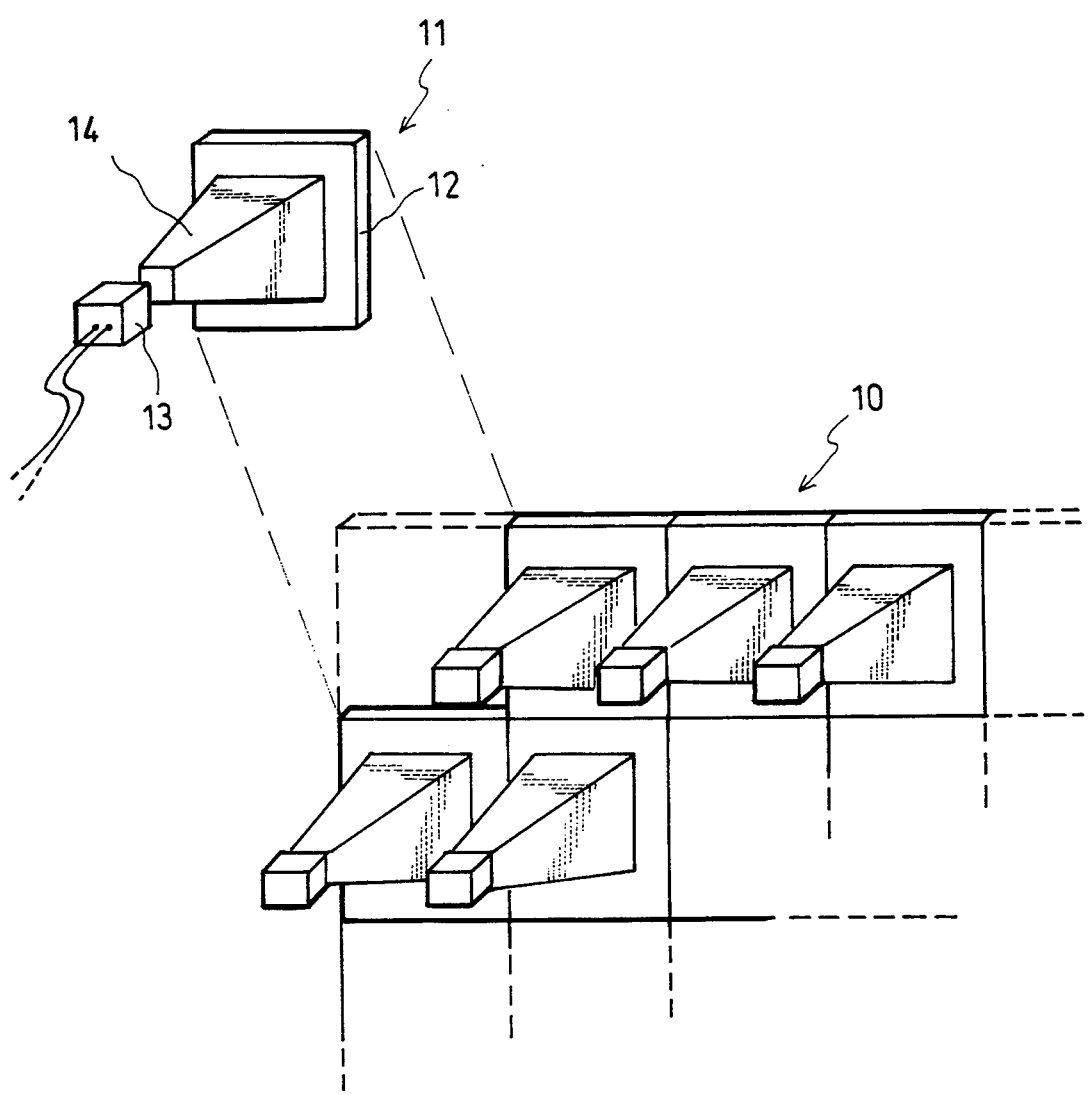

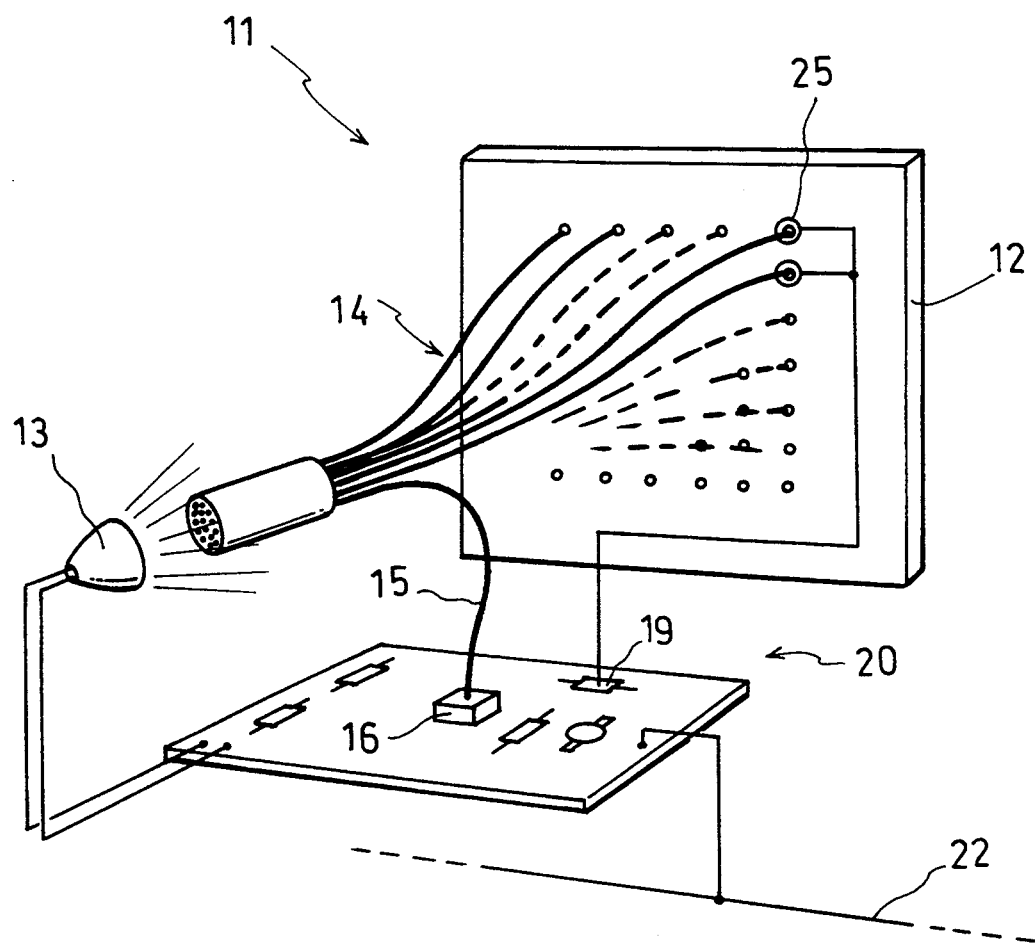
Fig_2

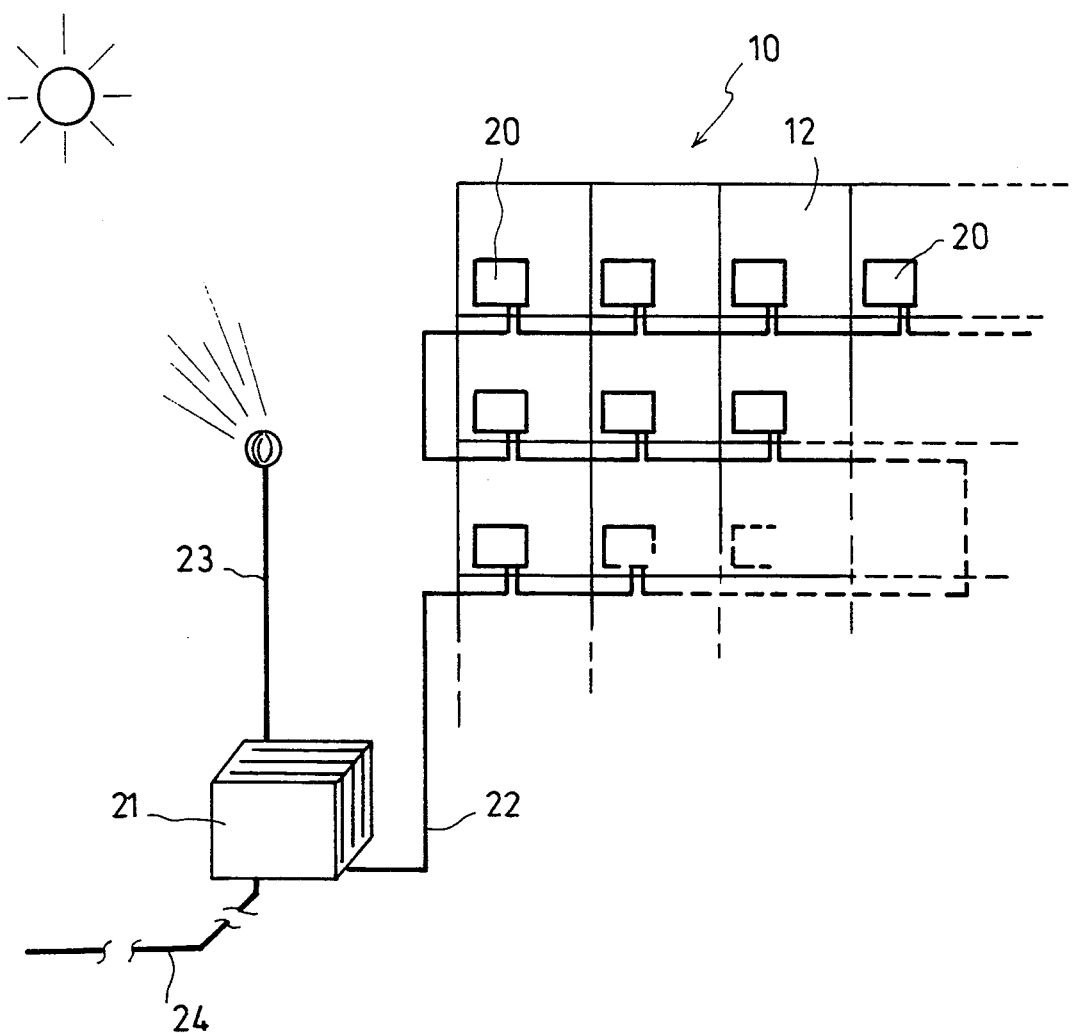
Fig_3

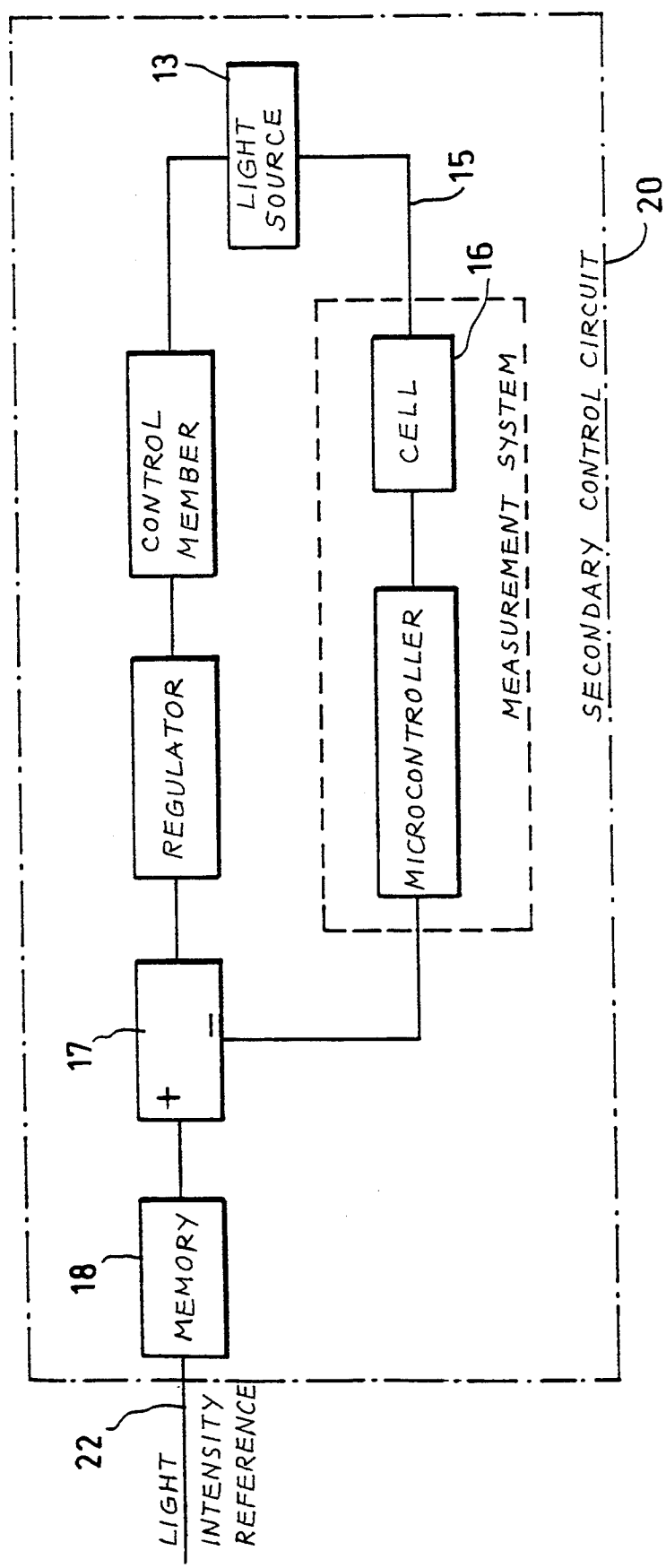
Fig_4

DISPLAY DEVICE

This is a continuation of application Ser. No. 08/022,364, filed on Feb. 25, 1993, now abandoned.

The present invention relates to a luminous display device for displaying a variable message, the device being in the form of a panel comprising a plurality of juxtaposed display subassemblies for display by means of bundles of optical fibers, each subassembly including at least one light source, as described in application FR-A2 535 882, for example.

BACKGROUND OF THE INVENTION

Several technologies are known to exist for making panels for displaying varying alphanumeric messages, in particular for roadsigns or for advertising displays. Such panels are often implemented by assembling unit modules or subassemblies which are constituted by a portion of the main screen and an image-creating device. Optical fiber panels make it possible:

to display a plurality of pre-established symbols or messages of various colors and shapes;

to flash at an adjustable frequency and thus attract attention; and to possess a high level of brightness in the observation direction with low electricity consumption, thereby remaining visible even under extremely unfavorable conditions.

The device may be of the electromechanical type having, for example, occultation means associated with one or more optical fibers for each point or pixel of the screen.

Whatever type of lighting is used, light sources always suffer from the drawback of presenting a large amount of dispersion in their performance. Panels comprising a plurality of light sources therefore lack uniformity in message display, since each of the subassemblies cannot reproduce the same brightness. In addition, light sources such as arc lamps, halogen lamps, or lasers, for example, deteriorate over time, and often differently within a single batch of such sources. As a result the differences in brightness between the subassemblies of a given panel can only get worse over the lifetime of the light sources.

OBJECTS AND SUMMARY OF THE INVENTION

An object of the present invention is to provide a variable message luminous display device in the form of a panel comprising n juxtaposed display subassemblies for display by means of bundles of optical fibers, each subassembly including at least one light source, the panel enabling the above-mentioned drawbacks to be mitigated. According to the invention, it further comprises:

a main control circuit for generating a light intensity reference;

n secondary control circuits, each associated with a respective one of the n display subassemblies, each secondary control circuit including means for receiving said reference and means for monitoring the light source(s) of the associated subassembly so that each emitted light intensity corresponds to said reference light intensity;

the monitor means presented by each secondary control circuit comprising means for directly detecting each light intensity emitted by the associated light source(s), means for comparing each light intensity with said reference, and means for controlling the power supply to the associated light source(s) as a function of the result of the comparison; and the means for direct detection of each light intensity comprise one or more fibers of the bundle of optical fibers and connected to a photoelectrical converter device.

Because of this design, local action directly on each subassembly makes it possible both to manage the brightness of the entire display device and also to guarantee uniformity between all of the subassemblies.

The following advantageous dispositions are also preferably adopted:

the main control circuit is connected by an external communications network to an information processing system for generating the light intensity reference;

the main control circuit is connected to at least one external sensor for measuring the lighting level in the environment of the display device, in order to determine the light intensity reference;

each secondary control circuit includes means for returning information to the main control circuit concerning the operation of the associated light source(s); and each secondary control circuit includes further means for controlling the display of the matrix formed by the bundle of optical fibers.

BRIEF DESCRIPTION OF THE DRAWINGS

The invention will be better understood dn other characteristics will appear on reading the following description of an embodiment, given with reference to the accompanying drawings, in which:

FIG. 1 is a diagrammatic view showing how a state of the art display device is assembled;

FIG. 2 shows a display subassembly and the associated secondary control means of the invention;

FIG. 3 shows the communications and data processing network of a device of the invention; and FIG. 4 is a block diagram showing the operation of a secondary control means of the invention.

MORE DETAILED DESCRIPTION

As shown in FIGS. 2 and 3, the display device is the result of assembling n display subassemblies 11 each comprising a portion 12 of the main screen 10, thereby building up a variable message panel. A digitized light intensity reference is communicated by a main control circuit 21 or "master unit" to n secondary control circuits 20 or "slave units", each being associated with a respective one of the n display subassemblies 11 making up the panel.

The main control circuit 21 is constituted by an electronics card or by a set of such cards, depending on the size and the complexity of the panel. It is connected to the set of secondary control circuits 20 via a bus type network 22 which conveys the digital reference and which is capable of managing a large number of brightness levels, e.g. as a function of the use to which the panel is put, as a function of the position of the panel relative to a source of light in the environment such as the sun or spotlamps, as a function of ambient light in the daytime, at night, indoors, or out-of-doors, or even as a function of the position of the sun above the horizon.

Each secondary control circuit 20 is implemented as a printed circuit and serves to power one or more unit light sources 13 corresponding to the light requirements of the smallest subassembly 11. This power supply may be continuous or it may be a chopper supply.

As shown in FIG. 4, each secondary control circuit 20 includes means for receiving light intensity references, such as a memory 18, and means for monitoring the light source 13.

The monitoring means are constituted firstly by means for directly detecting the intensity of light from the light source 13 and comprise one or more optical fibers 15 connected to a photoelectrical converter device 16 such as a semiconductor cell or a photoresistor, for example. The cell is selected so as to have a spectrum response that is as close as possible to the response of the human eye.

The monitoring means are also constituted by means for comparing the light intensity from each light source 13 with the light reference. The optical magnitude sensed by the cell is converted into an analog electrical magnitude and then into a digital magnitude suitable for processing by a microcontroller. Once converted, this information can be compared electronically by a comparator 17 with values stored in the memory 18 of the secondary control circuit 20.

The monitoring means are finally constituted by means for controlling the power supply to the light source 13 as a function of the result of the comparison which, applying a feedback method, adjusts the electrical voltage to be applied to the light source 13 so as to obtain the desired light level while nevertheless taking account of the intrinsic performance of the secondary control circuit 20.

Because of this feedback method using a system comprising measurement, adjustment, and a control member, the main control circuit 21 is never directly concerned with the values of the electrical voltages applied to the light sources 13, which task is performed entirely by the secondary control circuits 20.

However, each secondary control circuit 20 includes means for returning information to the main control circuit 21 in the event of a light source 13 failing, or if it becomes impossible to reach the requested light level. Under such circumstances, the main control circuit 21 which can locate the secondary control circuit 20 that is in difficulty because of an addressing system on the internal communications bus 22 takes a decision to remedy the failure, for example:

to switch on a second or "spare" light source 13 which is already connected to the faulty secondary control circuit 20;

to reduce one or more of the light levels in the panel assembly 10 in order to maintain overall uniformity thereof, assuming that the failure is merely partial degradation in the light source(s) 13 due to normal aging; or cause the entire panel to be switched off if the degradation of one or more of the subassemblies 11 is such as to be too harmful for the quality of the information that is to appear on the panel 10.

The main control circuit 21 controls these various options by means of appropriate software.

In the event that the panel is connected to a communications network 24, and possibly also to other panels, the light level may be set remotely, from an external computer system. Under such circumstances, the main control circuit 21 may in turn report failures to the external computer system.

The ambient lighting value specific to the environment of the panel 10 is preferably communicated to the main control circuit 21 from digital or analog outside sensors 23, e.g. photoelectric cells, that are connected directly thereto. The main control circuit 21 establishes a relationship between said ambient lighting value and the ideal light level for the panel by making use of pre-established values stored in its electronic memory.

In a variant, each secondary control circuit 20 further includes means 19 for controlling the display of the matrix formed by the bundle of optical fibers 14. In a preferred configuration, electromechanical occultation means 25 are interposed on the light path between the light source and the front of the matrix. Each occultation device 25 includes disks having various occultation sectors and it is rotated by a rotary motor having two stable equilibrium positions. In other configurations, the occultation device 25 could be of the electro-optical type, e.g. having matrices of liquid crystal cells, or it could be of the type having a solid state actuator such as the microstructures that are obtained by machining a semiconductor substrate. The information participating in this display operation is emitted by the main control circuit 21 which then also performs the function of synchronizing the information sent to the various secondary control circuits 20.

The embodiments described above may be subjected to various modifications without thereby going beyond the ambit of the protection as defined by the accompanying claims.

I claim:

1. In a luminous display device for displaying a message on a panel, the panel comprising n juxtaposed display subassemblies, each for the display of 1/n of the message by means of bundles of optical fibers, each subassembly including at least one light source, the improvement comprising:

a main control circuit for generating a plurality of different light intensity references;

means for selecting one of said intensity references for transmission to all of the subassemblies; and n secondary control circuits, each associated with a respective one of the n display subassemblies, each secondary control circuit including means for receiving the selected reference and means for monitoring the light source of the associated subassembly so that each emitted light intensity corresponds to said reference light intensity;

the monitoring means of each secondary control circuit comprising means for directly detecting each light intensity emitted by the associated light source, means for comparing each light intensity with the selected reference, and means for controlling the power supply to the associated light source as a function of the result of the comparison; and the means for direct detection of each light intensity comprising at least one fiber of the bundle of optical fibers connected to a photoelectrical converter device.

2. A display device according to claim 1, wherein the main control circuit is connected by an external communications network to an information processing system for selecting the light intensity reference.

3. A display device according to claim 1, wherein the main control circuit is connected to at least one external sensor for measuring the lighting level in the environment of the display device, in order to select the light intensity reference.

4. A display device according to claim 1, wherein each secondary control circuit includes means for returning information to the main control circuit concerning the operation of the associated light source.

5. A display device according to claim 1, wherein each secondary control circuit includes further means for controlling the display of the matrix formed by the bundle of optical fibers.

6. In a luminous display device for displaying a message on a panel, the panel comprising n juxtaposed display subassemblies, each for the display of 1/n of the message by means of bundles of optical fibers, each subassembly including at least one light source, the improvement comprising:

a main control circuit for generating a light intensity reference; and n second control circuits each associated with a respective one of the n display subassemblies, each secondary control circuit including means for receiving the reference and means for monitoring the light source of the associated subassembly so that each emitted light intensity corresponds to the reference light intensity;

the monitoring means of each secondary control circuit comprising means for directly detecting each light intensity emitted by the associated light source, means for comparing each light intensity with said reference, and means for controlling the power supply to the associated light as a function of the result of comparison;

the means for direct detection of each light intensity comprising at least one fiber of the bundle of optical fibers connected to a photoelectrical converter device; and the main control circuit being connected to at least one external sensor for measuring the lighting level in the environment of the display device in order to determine the light intensity reference.

7. In a luminous device for displaying a message on a panel in an environment where the panel is illuminated by ambient light, the panel comprising n juxtaposed display subassemblies, each for the display of 1/n of the message by means of bundles of optical fibers, the improvement comprising;

n light sources each associated with a respective one of the n display subassemblies, a power supply for each of the light sources, means for measuring the ambient light intensity and for generating a light intensity reference in response to the measured intensity, n first control means, each associated with a respective one of the n display subassemblies, all of the first control means including means for receiving the reference, and each of the first control means including means for measuring the intensity of the light source of the associated subassembly and for controlling the light source intensity in response to the reference light intensity.

8. A display device according to claim 7, including a second control means for controlling all of said first control means for controlling the overall appearance of said display, each said first control means being responsive to said second control means for controlling the appearance of the associated subassembly.

* * * * *